US012367068B2

(12) United States Patent
Bessiere et al.

(10) Patent No.: US 12,367,068 B2
(45) Date of Patent: Jul. 22, 2025

(54) DISTRIBUTED EVENT PLATFORM FOR PROCESSING AND PUBLISHING EVENT TRANSACTIONS

(71) Applicant: AMADEUS S.A.S., Biot (FR)

(72) Inventors: David Bessiere, Grasse (FR); David Pasero, Mougins (FR); Tony Bisegna, Vallauris (FR); Guillaume Pain, Grasse (FR); Andreu Marco Garrido, Golfe Juan (FR)

(73) Assignee: AMADEUS S.A.S., Biot (FR)

( * ) Notice: Subject to any disclaimer, the term of this patent is extended or adjusted under 35 U.S.C. 154(b) by 473 days.

(21) Appl. No.: 17/852,497

(22) Filed: Jun. 29, 2022

(65) Prior Publication Data

US 2023/0010765 A1    Jan. 12, 2023

(30) Foreign Application Priority Data

Jul. 9, 2021 (EP) ..................... 21305957

(51) Int. Cl.
*G06F 9/48* (2006.01)
*G06F 9/445* (2018.01)
*G06F 9/46* (2006.01)
*G06F 9/50* (2006.01)

(52) U.S. Cl.
CPC ........ *G06F 9/4881* (2013.01); *G06F 9/44505* (2013.01); *G06F 9/467* (2013.01); *G06F 9/5077* (2013.01)

(58) Field of Classification Search
CPC ..... G06F 9/4881; G06F 9/44505; G06F 9/457
See application file for complete search history.

(56) References Cited

U.S. PATENT DOCUMENTS

| 10,484,326 B2 | 11/2019 | Norwood et al. |
| 2019/0065246 A1* | 2/2019 | Senapaty .............. G06F 9/5088 |
| 2021/0141679 A1 | 5/2021 | Li et al. |

OTHER PUBLICATIONS

Extended European Search Report, mailed Dec. 8, 2021, issued in corresponding European Patent Application No. 21305957.9, Filed Jul. 9, 2021.

\* cited by examiner

*Primary Examiner* — Wissam Rashid
(74) *Attorney, Agent, or Firm* — PERRY + CURRIER INC.

(57) ABSTRACT

The present invention is directed to a system and a method for ensuring high availability and guarantee delivery of event streams to target consumer applications. The distributed event streaming platform of the present invention is provided with an event streaming layer comprising a plurality of independent and non-replicating event streaming clusters that are configured to process events received from a producer module. A monitoring module is provided to monitor the propagation and delivery of each propagated event based on event notifications received from an event producer module and a plurality of the consumer modules.

15 Claims, 5 Drawing Sheets

DISTRIBUTED EVENT PLATFORM FOR PROCESSING AND PUBLISHING EVENT TRANSACTIONS

FIELD

The present invention relates to a distributed event platform configured to process and publish event transactions to one or more target consumer applications. In particular, the present invention relates to a distributed event platform configured to ensure high availability and guaranteed delivery of events to one or more target consumer applications.

BACKGROUND

Event streaming platforms have become increasingly popular for communicating real-time event streams from an event source to one or more target consumer applications without interruptions. In some cases, it is desirable for the event streaming platform to guarantee the delivery of the events propagated to the target consumer applications while delivering the events without any interruptions. Known event streaming platforms use a streaming module such as Kafka®, which includes a delivery mechanism, internal resiliency and high-availability mechanisms within a cluster of one or more servers. However, such event steaming platform architectures are not resilient against a cluster-wide failure, thus cannot guarantee the high availability of the streaming service without any interruptions. To increase resiliency, known solutions implement a multi-cluster deployment of the streaming platform, where each cluster runs a replicated version of the streaming module. However, multi-cluster deployment increases complexity due to bidirectional mirroring between clusters and does not prevent data loss caused by a logical cluster failure due to asynchronous mirroring, e.g. latent upgrade issue, operational error, and the like.

Therefore, there is a need to provide an improved distributed event streaming platform that ensures improved availability of resources while guaranteeing the delivery of messages.

SUMMARY OF THE INVENTION

An aim of the present invention is to provide a system and a method for event streaming in a distributed environment that overcomes the disadvantages of prior art solutions.

The aim of the present invention is achieved in accordance with the system and method showing the characteristics of the independent claims. Preferred embodiments are described in the dependent claims.

According to a first aspect of the present invention, a distributed event platform is presented configured for propagating events from at least one event source to one or more target consumer applications, the distributed event platform comprising:
 an event source configured to store and push events to be propagated to one or more target consumer applications;
 an event producer module configured to queue and propagate events received from the event source to an event streaming layer of the distributed event platform, the event streaming layer comprising a plurality of event streaming modules, each configured to index and store the events received from the event producer module into one or more storage partitions associated with one or more corresponding target consumer applications; and
 a plurality of consumer modules communicatively coupled to the event streaming layer, each consumer module being associated with at least one target consumer application and configured to retrieve and propagate events from the storage partitions associated with each corresponding target consumer application;
 wherein the event streaming layer comprises a monitoring module configured to monitor the propagation and delivery of each event in the event source based on event notifications received from the event producer module indicating the propagation of events to an event streaming module and event notifications received from each of the consumer modules indicating the delivery of corresponding propagated events, the monitoring module is configured, based on the information received from the event producer and each of the consumer modules, to update an event monitoring status table stored in a database associated with the monitoring module and at least indicating the delivery status of each propagated event.

The present invention provides a system for processing and propagating events from an event source to target consumer applications that ensure high availability and guaranteed delivery of events. According to the present invention, high availability is achieved by providing an event streaming layer comprising a plurality of independent and non-replicating streaming modules. At the same time, guaranteed delivery is achieved by providing a monitoring module that monitors the delivery of events propagated to the event streaming layer and accordingly updates the transaction status of the corresponding event in the event source. Each streaming module may be in any desired form, such as a software bus that uses stream processing to handle the events received from the event producer module, e.g. Apache Kafka®, or a similar event streaming handling framework. Each streaming module may be implemented in an independent cluster of virtual machines, which are preferably positioned in isolated server zones. As such, the event streaming layer can absorb cluster-wide failures occurring in isolation zones, thus ensuring the continuous operation of the event distribution platform.

Furthermore, since each streaming module is an independent and non-replicated module, i.e. no synchronisation of content is necessary between streaming modules, the number of streaming modules may be quickly adjusted according to the workload requirements. The monitoring module is configured to monitor the delivery of events based on information received from the event producer and each of the consumer modules. The monitoring module processes information from the event producer associated with the propagation of an event with corresponding information received from the consumer modules, and based on the information, determines whether a propagated event has been delivered successfully. For example, the event producer may send to the monitoring module information associated with an event propagated to one or more streaming modules, which is then compared with information received from the consumer modules. The information received from the event producer and/or the consumer module may comprise any one or combination of the event name, the streaming module used, target consumer application, and the like. The monitoring module is configured, based on the information received from the event producer and/or the consumer module, to update an event monitoring status table stored in a database of the monitoring module, which indicates the status of each event propagated by the producer module. In essence, each time an event is propagated, the producer sends a notification to the monitoring module. The monitoring module, based on the information in the propagation notification, updates the even monitoring status table, e.g. by adding a new line in the table with the information of the event. Accordingly, upon receiving a delivery notification from a consumer module, the monitoring module is configured to update the delivery status of the corresponding event in the monitoring table. Furthermore, the monitoring module is configured to update, upon successful delivery of an event, the transaction status of the corresponding event in a transaction status table, which is stored in a database of the event source. The transaction status table is configured to track the status of each event as it is propagated through the different stages of the distributed event platform. For example, the transaction status of an event may indicate whether the event producer has received the event, e.g. status received, is waiting in a queue to be propagated, e.g. status may be set to pending, propagation of the event to a streaming module, e.g. status may be set to propagate, if the event has been successful or unsuccessful delivered to a target consumer application, e.g. status may be set to deliver or not delivered, and the like. It should be noted that the event monitoring status table and event transaction status table may be stored in the same database, e.g. Travel order database.

According to embodiments of the present invention, in response to receiving an event notification from the producer module and/or the consumer module indicating a successful propagation and/or delivery, the monitoring module is configured to update the transaction status of the corresponding event in a transaction status table stored in the event source configured to track the status of each event stored in the event source.

According to embodiments of the present invention, the monitoring module is configured, upon receiving an event propagation notification from the producer module indicating the propagation of an event, to initiate a corresponding timer indicating a target time frame for the propagated event to be delivered to the target consumer application. According to embodiments of the present invention, the monitoring module is configured to stop the timer upon delivery of the propagated event, based on a delivery notification received from at least one of the consumer modules.

According to embodiments of the present invention, upon expiry of the timer or in response to receiving an event notification from a consumer module indicating unsuccessful delivery of an event, the monitoring module is configured to notify the event producer module to re-propagate the affected events.

The monitoring module of the present invention keeps track of the time taken for an event to be delivered to the target consumer application. For example, the monitoring module is configured to start for each propagated event, a timer indicating the expected time frame for the event to be delivered. If the event is not delivered within the expected time frame, then the event is considered undelivered. Accordingly, the monitoring module triggers the re-propagation of the affected event by issuing a notification to the producer.

According to embodiments of the present invention, the monitoring module is configured to monitor a set of operational parameters associated with the streaming modules and the consumer modules. Based on the values of the parameters, determine the operating performance of each corresponding consumer/or streaming module. In addition to monitoring the delivery of events, the monitoring module monitors the operational performance of each streaming and/or consumer module, indicating the ability of each streaming and/or consumer module to process events according to their specified function to ensure that a propagated message is delivered to the target application. As such, operational failures of a streaming module and/or a consumer module may be quickly detected and resolved. For example, the monitoring module may monitor operating parameters associated with the functionality of each streaming and/or consumer modules, such as workload, availability, response time, and the like.

According to embodiments of the present invention, in response to an operational performance value of streaming and/or consumer module being within a threshold value range indicating an operational failure and/or unavailability of the corresponding streaming and/or consumer module, the monitoring module is configured to notify the event producer module to re-propagate the affected events.

According to embodiments of the present invention, the event producer is configured to select streaming modules to propagate an event based on the operation performance information forwarded by the monitoring module.

The monitoring module is configured to inform the producer module of the operating performance of each streaming module and/or consumer module. In turn, the producer module may use the information received from the monitoring module to select the streaming modules to propagate an event. Furthermore, in case of a cluster failure, which may be indicated by the operational performance parameters, the monitoring module may be configured to notify the event producer module to propagate again the events affected. Depending on the nature of the operational failure and the module affected. The event producer module may select, based on the operational performance, one or more event streaming modules to propagate the affected events. In general, the producer is configured to propagate events to all of the available streaming modules. The information associated with the operational performance parameters may be obtained periodically by the monitoring module, e.g. at a specific time frame, the monitoring module may request a status update from each event streaming and/or consumer module. Furthermore, the information associated with the operational performance parameters may be dynamically communicated to the monitoring module by each event streaming and consumer module.

According to embodiments of the present invention, the event producer module is configured, upon propagation of an event to a streaming module, to update the corresponding transaction status of the event in the transaction status table to indicate its successful propagation.

According to embodiments of the present invention, the event source is in the form of a data store such as a relational database management system, RDBMS, or equivalent. The data store should be capable of maintaining a relationship between the events received from an event source and events delivered, thereby acting as a single source of truth between the data received and the delivery of the event to the target application. As such, in case that the delivery of events is deemed unsuccessful, it becomes possible to re-inject undelivered messages, thereby guaranteeing delivery while avoiding synchronisation between the event streaming modules, which is the case with the prior art solutions.

According to embodiments of the present invention, each streaming module is independent of one another and hosted on a separate virtual machine server cluster.

According to embodiments of the present invention, each virtual machine server cluster is hosted in a different isolation zone.

The provision of independent and non-replicating streaming modules hosted on isolated clusters has the advantage that wide cluster failures are confined to the individual cluster without affecting the operation of the other event streaming clusters in the event streaming layer. In this way, the event streaming platform of the present invention can guarantee the high availability of resources and prevent loss of data or operation disruptions due to a cluster-wide failure. For example, each cluster may be hosted on a different isolation zone, e.g. different geographic location, different server farm, different infrastructure provider, and the like.

According to embodiments of the present invention, the distributed event platform is part of a travel reservation system.

According to embodiments of the present invention, an event transaction is associated with an action performed on a travel booking record such as passenger name record, PNR. It should be noted that the present invention may be applied to other types of event transactions.

According to a second aspect of the present invention, a method for processing events in a distributed event platform is provided, the method comprising:
  receiving, at an event producer module, an event from an event source configured to store and push events to be propagated to one or more target consumer applications;
  queueing, at the event producer module, the event to be propagated;
  propagating, by the event producer, each event in the queue to a streaming module of an event streaming layer of the distributed event platform, each streaming module is configured to index and store the events into one or more storage partitions associated with one or more corresponding target consumer applications;
  retrieving, by a consumer module associated with one or more target consumer applications, an event from a corresponding storage partition of a streaming module;
  propagating, by the consumer module, the retrieved event to the target consumer applications
  monitoring, at a monitoring module, the propagation and delivery of each event in the event source based on event notifications received from the event producer module indicating the propagation of events to an event streaming module and event notifications received from each of the consumer modules indicating the delivery of corresponding propagated events; and
  updating, by the monitoring module, an event monitoring status table stored in a database associated with the monitoring module and at least indicating the delivery status of each propagated event.

In some embodiments, the method comprises method steps corresponding to any one of the distributed event platform functions set out above.

BRIEF DESCRIPTION OF THE DRAWINGS

The following drawings are provided as an example to explain further and describe various aspects of the invention.

DETAILED DESCRIPTION

The present invention will be illustrated using the exemplified embodiments shown in the figures, which will be described in more detail below. It should be noted that any references made to dimensions are only indicative and do not restrict the invention in any way. While this invention has been shown and described with reference to certain illustrated embodiments thereof, it will be understood by those skilled in the art that various changes in form and details may be made therein without departing from the scope of the invention. Furthermore, while the invention has been described with references to a particular system and/or a method for managing the synchronisation of routing configuration files in a distributed messaging system, it should be understood by those skilled in the art that changes in the form and details may be made to facilitate other types of method and/or systems in related fields without departing from the scope of the invention.

Figure 1:
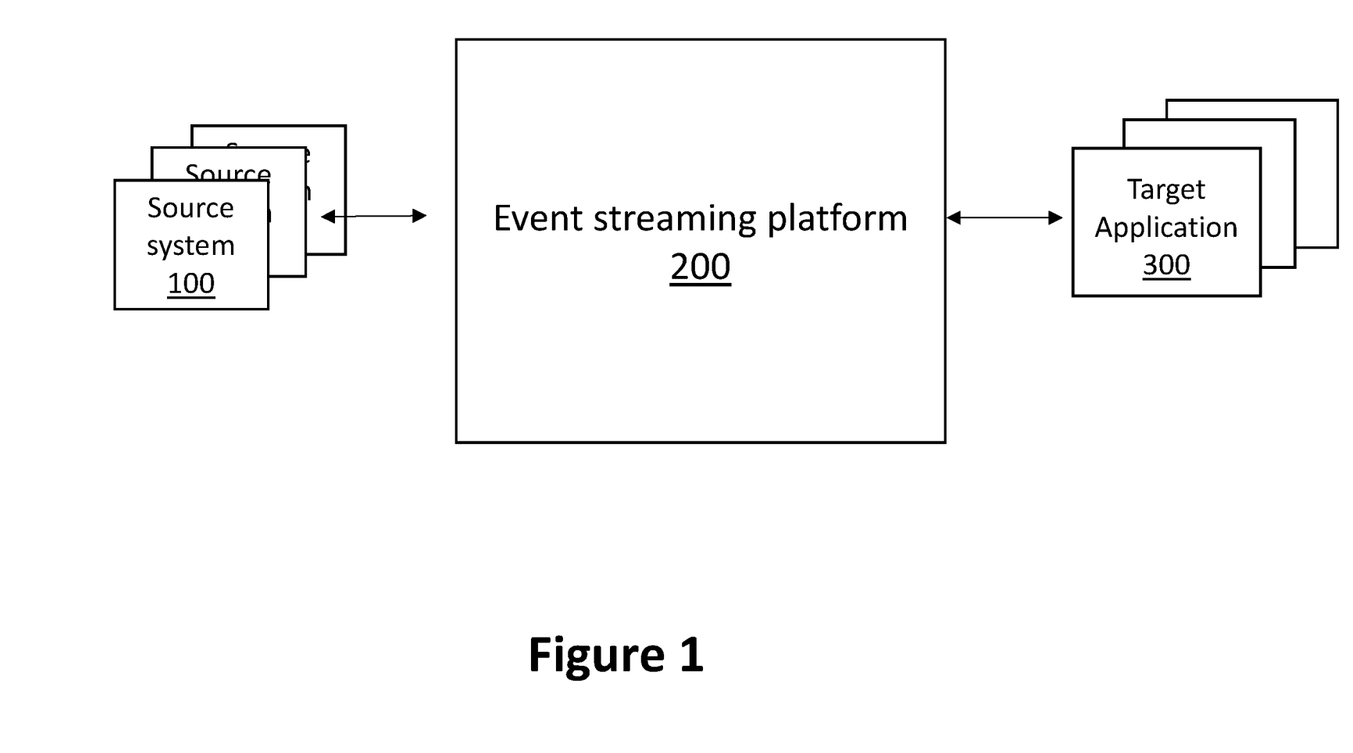
FIG. 1 shows an example of a distributed event system according to embodiments of the present invention.
Figure 2:
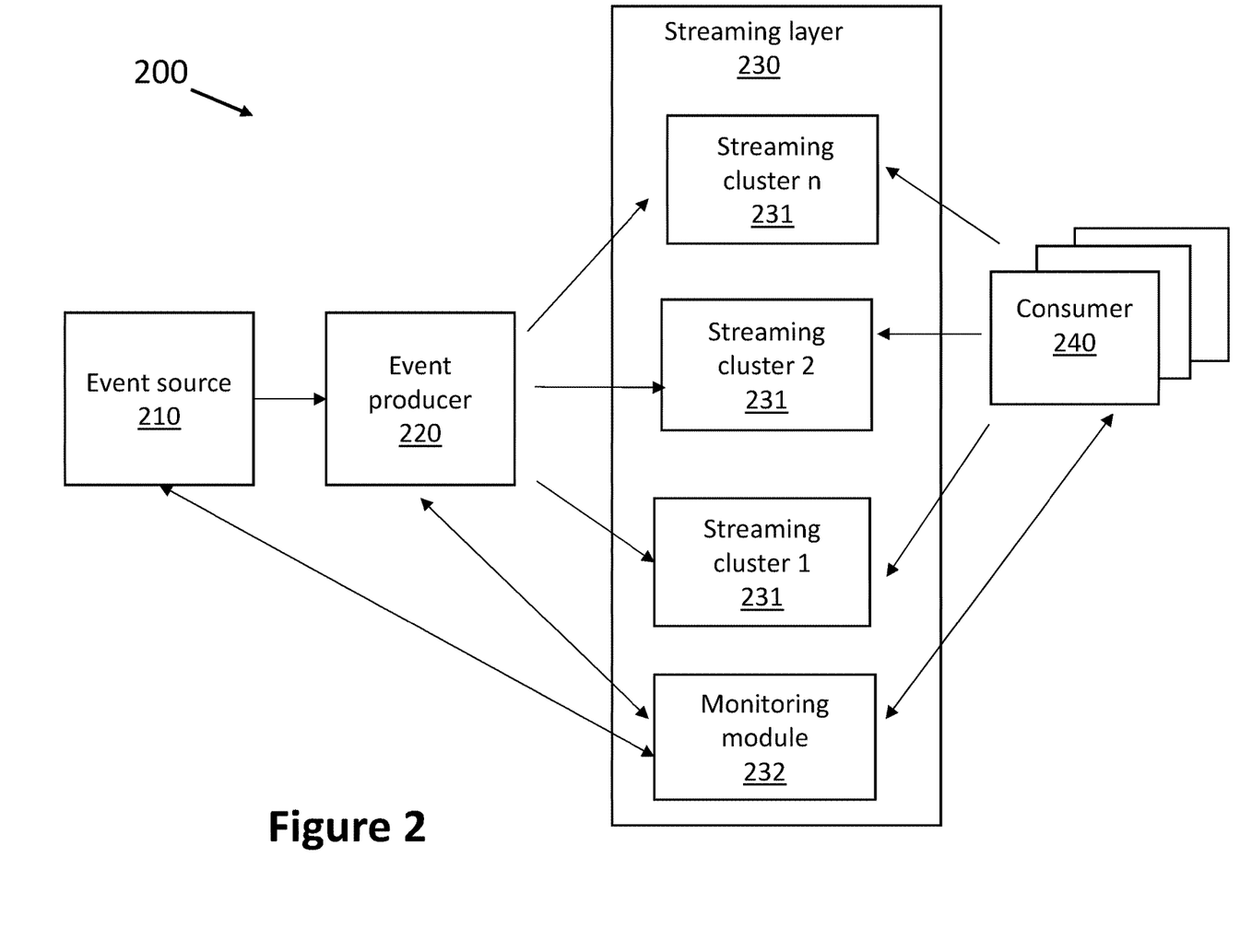
FIG. 2 shows an exemplified implementation of a distributed event platform according to embodiments of the present invention.

FIGS. 1 and 2 show an exemplified implementation of an event streaming architecture according to embodiments of the present invention. A distributed event platform 200 is provided for propagating events from a source system 100 to one or more target applications 300. The event streaming platform 200 may be provisioned on computing resources provided by one or more cloud service providers. The event streaming platform 200 comprises an event source 210 configured to store events pushed by one or more source systems 100. The event source 210 may be a relational database management system (RDBMS) or equivalent data store, which is configured to push events for propagation to an event producer module 220. The event source 210 is provided with a transaction status table 211, which is configured to maintain a log of the transaction status of each event as it is propagated through the different stages of the event streaming platform 200. The event producer module 220 may be in the form of a group of event producer modules 220, each configured to communicate with one or more of the event streaming clusters 231 of an event streaming layer 230. Each event streaming cluster 231 is independent of one another and hosted on a separate server cluster of a cloud service provider. As such, each event streaming cluster 231 is isolated from each other, thereby providing resiliency against cluster-wide failures and ensuring the continuous operation of platform 200.

In general, the independent and non-replicating nature of the event streaming clusters 231 enables the quick deployment of additional event streaming resources to deal with an increased workload. Each event streaming cluster 231 is configured to index and store the events into corresponding storage partitions. An event consumer module 240, also referred to as an event publisher, is provided to retrieve events associated with one or more target consumer applications from the storage partitions of the event streaming cluster 231 and accordingly propagated them to the desired destination. Each event producer 220 is configured to propagate an event to all the available event streaming cluster 231.

The availability of each event streaming cluster 231 may be determined based on information received from the monitoring module 232 associated with the functionality of each streaming cluster 231. The number of available streaming clusters 231 may be dynamically adjusted according to a set of criteria, such as workload, availability, and the like. In order to monitor the delivery of the propagated events to the target consumer applications 300, the event streaming platform 200 is provided with a monitoring module 232 configured to determine based on information received from the consumer module 240 and/or the event producer module 220 whether an event was successfully delivered or not. The monitoring module 232, based on the information received from the event streaming modules and the consumer module, is configured to update an event monitoring status table 212, which may be stored in the travel order database 210 of the event source or in a separate database accessible to the monitoring module 232. The monitoring module 232 is further configured, upon successful delivery of an event, to update the transaction status of the corresponding events in the transaction status table 211 in the event source 210. The monitoring module may be part of the event streaming layer 230, but it can equally be implemented in another part of the event streaming platform 200. As such, in the present distributed event streaming platform, the responsibilities for handling events and guaranteeing their delivery is divided between the event streaming clusters 231 and monitoring module 232. Therefore, synchronisation between streaming clusters 231 is no longer necessary. Each event streaming cluster 231 can be implemented as a separate entity, thereby ensuring that wide cluster failures occurring in an event streaming cluster 231 do not influence the operation of the other clusters 231.

Figure 3:
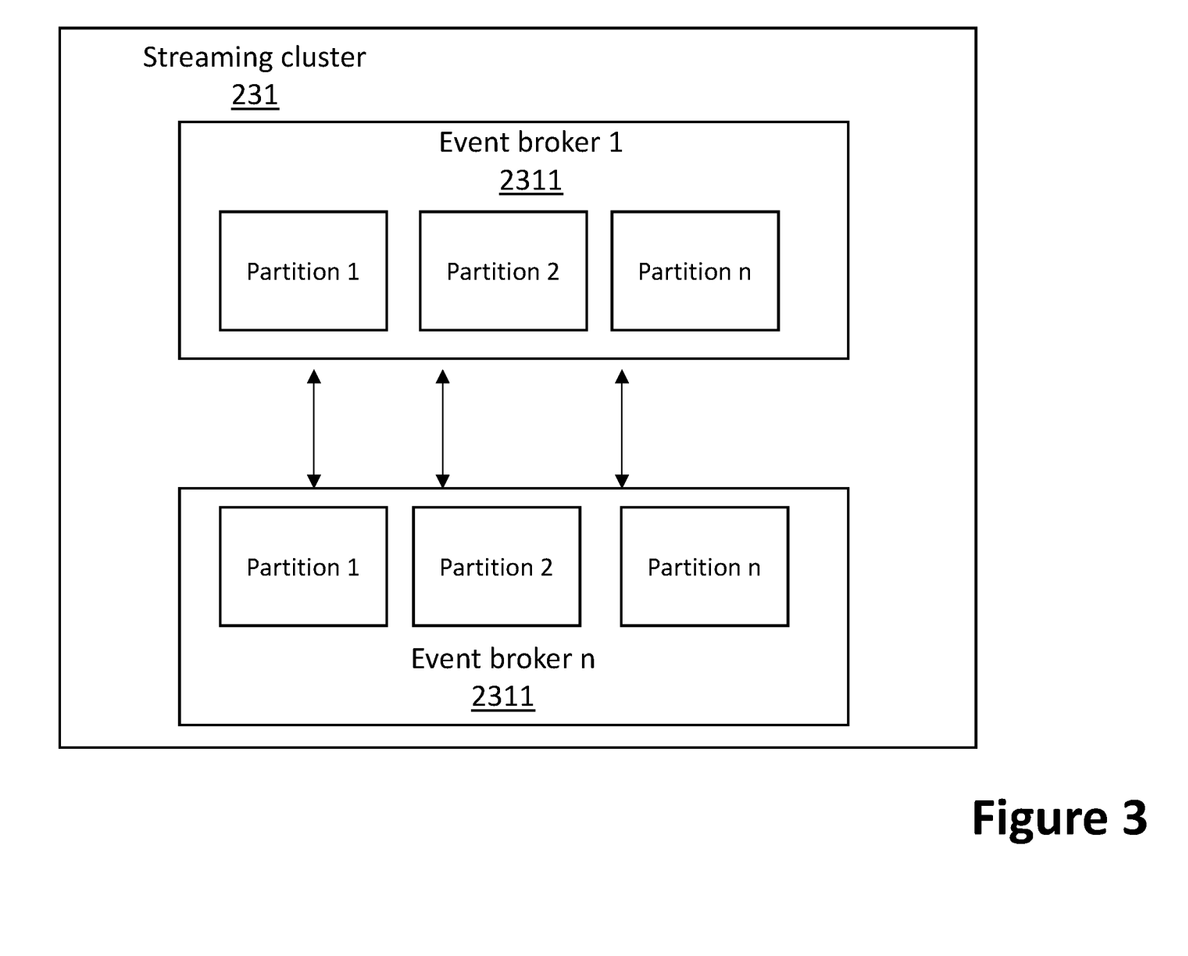
FIG. 3 shows an exemplified implementation of a single event streaming cluster with internal data replication according to embodiments of the present invention.

FIG. 3 shows single event streaming cluster 231 with internal data replication according to embodiments of the present invention. Each streaming cluster 231 may comprise one or more event brokers 2311 for handling events associated with a specific topic. Each event handling broker 2311 is configured to index and store the events in corresponding storage partitions, which may be associated with a target consumer application 300 and/or an event topic. Within an event streaming cluster 211, a replication process is performed between the event brokers 2311 to ensure resiliency against local failures, e.g. a storage partitions failure. Once an event is placed in a storage partition, it is ready to be consumed by one or more consumer modules 230 and propagated to the target consumer application. Each consumer module 230 may periodically query the content of the storage partitions to retrieve events associated with a corresponding target consumer application 300. Furthermore, events stored in the storage partition may be notified to the consumer modules 230 by the event brokers 2311. Each event streaming cluster 231 may be implemented in any desirable event streaming framework, e.g. Apache Kafka® and the like.

The monitoring module 232 of the present invention may be a standalone process and/or be part of the event streaming layer 230. In general, the monitoring module 232 is configured to monitor the delivery of messages, as previously explained, and further monitoring the operational performance and health of the components of the event streaming platform 200. For example, the monitoring module 232 is configured to monitor a set of operational parameters of the event streaming clusters 231 and/or the consumer modules 240. The operational parameters may comprise any one or a combination of response time, availability, workload, and the like. For example, the monitoring module 232 may query periodically the event streaming cluster 231 and/or the consumer modules 240 to determine their availability, response time, and the like. Based on the operational parameters, the monitoring module 232 is configured to determine an operating performance for the event streaming clusters 231 and/or the consumer modules, indicating their functionality and ability to process data correctly. The operating performance of the event streaming cluster 231 and/or the consumer modules 240 may be communicated to the event producer 220, which accordingly may determine based on the information received the availability of each event streaming cluster 231 for processing events.

Furthermore, the monitoring module 232, based on the operation performance of each event streaming cluster 231 and/or consumer module 240, may determine a failure of a component and accordingly notify the event producer 220 to re-inject the affected events to a different event streaming cluster 231. It should be noted that the monitoring module 232 may independently re-inject the affected events to an event streaming cluster 231 and accordingly update the transaction status table in the event source 210. For example, the monitoring module 232 may be configured to store the propagated events so that they can be re-propagated in case of a failure.

In general, the monitoring module 232 is configured each time an event is propagated to an event streaming cluster 231 to update the event monitoring status table 212, e.g. by adding the event in the table. Accordingly, the monitoring module 232 is configured to check the event monitoring status table 212 to determine whether a propagated event has been delivered to the target application in the desired time frame. If the desired time frame for receiving a delivery notification for a propagated event has been reached or exceeded, then the monitoring module 232 is configured to trigger the re-propagation of the event by issuing a notification to producer 220 to re-submit the propagated event, thereby preventing loss of data.

Figure 4:
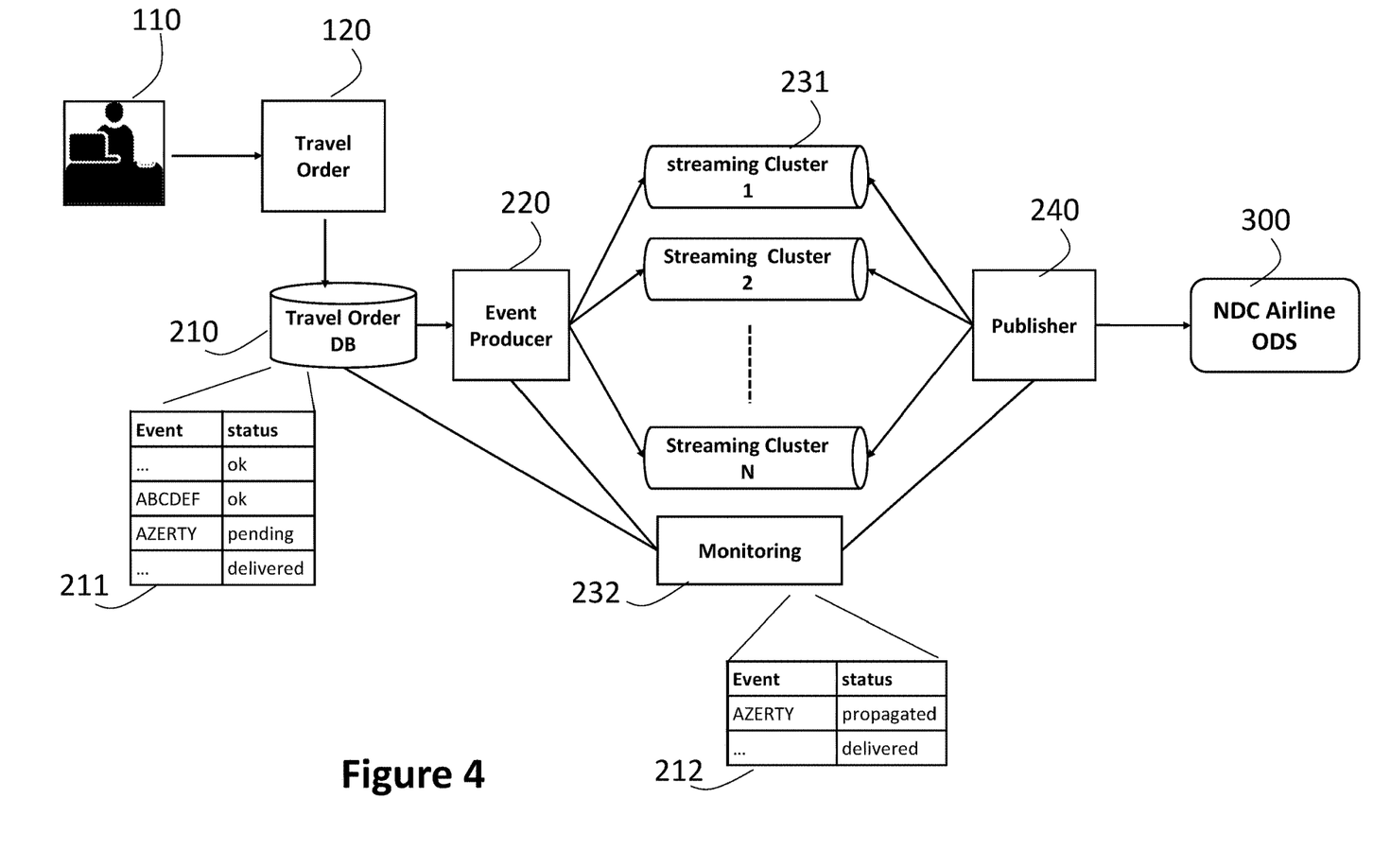
FIG. 4 show an example of event propagation from an event source to a target application according to embodiments of the present invention.

FIG. 4 shows an example of the distributed event streaming platform being part of a travel reservation system according to embodiments of the present invention. As shown, a user 110 accesses a travel order 120 associated with a passenger travel record (PNR) of a passenger. A change may be made to the travel order 120, such as adding travel services, changing information, and the like. The changes made to the travel order 120 are communicated in the form of events to the travel order database 210, where the events are logged into the transaction status table 211. The transaction status table 211 tracks the progress of each event as it moves through the different stages of the distributed event platform 200. For example, the transaction status of the event may indicate that an event has been propagated to an event streaming cluster 231, e.g. OK, an event is waiting to be propagated, e.g. pending, or an event has been delivered, e.g. delivered. Each event is pushed from the travel order database 210, which forms the event source, to the event producer 220. The event producer 220 is configured to propagate each event received from the travel order database 210 to the available event streaming clusters 231 of the streaming layer and accordingly update the status of the propagated event in the transaction status table 211. Additionally, the event producer 220 issues a notification to a monitoring module 232 comprising information associated with the propagated event and the event streaming cluster 231 used, e.g. cluster-ID. The monitoring module 232 is configured to update an event status monitoring table 211 with the information of the propagated event. A publisher 240, also referred to as the consumer module, retrieves the propagated events from the storage partitions of the event streaming clusters 231 and forwards them to the desired consumer application 300, which in this case is an Airline system, where the information contained in the event are consolidated. The publisher 230 is configured to send a notification to the monitoring module 232 comprising information on the events retrieved from the event streaming clusters. The monitoring module 232 is configured based on the information received from the event producer 220 to update the status of the corresponding propagated event in the event monitoring status table 211, thereby verifying that the propagated event has been delivered. Accordingly, the monitoring module 232 updates update the transaction status of the corresponding event in the transaction status table 211. As such, using the feedback information provided by the event publisher 240, it is possible to monitor the delivery of an event to the target application. As previously discussed, the event monitoring status table 212 and the transaction status table 211 may be stored in the travel order database 210 or in separate databases.

Figure 5:
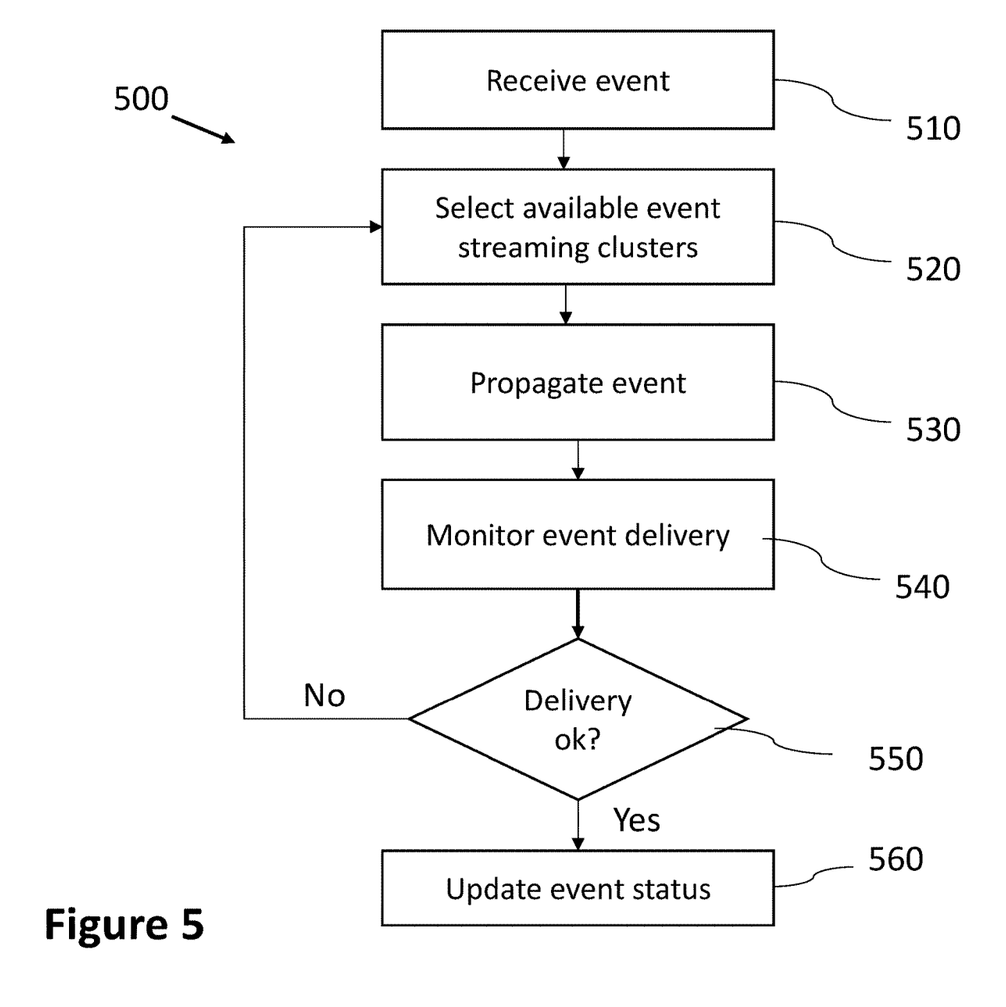
FIG. 5 shows an exemplified method for propagating events and monitoring their delivery to the target applications according to embodiments of the present invention.

FIG. 5 shows an exemplified method 500 for propagating an event to a target consumer application 400 according to embodiments of the present invention. The process starts, at step 510, by receiving an event at an event producer 220. The event is added to a queue, and the event producer 220 selects the available event streaming clusters 231 in the event streaming layer 230 to forward the event at step 520. The event is propagated, at step 530, to the available event streaming clusters 231. At step 530, a notification is sent to the monitoring component 232, comprising information regarding the propagated event. At step 540, the monitoring module 232 monitors the delivery of the event based on information received from the consumer module 240, the event producer module 220, and/or the event streaming clusters 231, e.g. failure of a cluster. At step 550, the information received is processed, and a determination is made as to whether the delivery of the event was successful or not. If the delivery was successful, then the transaction status of the event is updated in the transaction status table. Otherwise, a notification is sent to the publisher to re-inject the propagated message to a different event streaming cluster 231. Upon receiving a notification to re-propagate an event by the monitoring module, the event producer 220 is configured to select the available event streaming clusters 231 to re-submit the event. The process may continue until all events in the event source 210 have been successfully delivered, thereby guaranteeing the delivery of the event and preventing loss of data without sacrificing availability.

In some embodiments, the method comprises method steps corresponding to any one of the systems for managing the allocation of computing resources functions set out above.

The invention claimed is:

1. A distributed event platform configured for propagating events from at least one event source to one or more target consumer applications, the distributed event platform comprising:
   an event source configured to store and push events to be propagated to one or more target consumer applications;
   an event producer module configured to queue and propagate events received from the event source to an event streaming layer of the distributed event platform, the event streaming layer comprising a plurality of event streaming modules, each configured to index and store the events received from the event producer module into one or more storage partitions associated with one or more corresponding target consumer applications; and
   a plurality of consumer modules communicatively coupled to the event streaming layer, each consumer module being associated with at least one target consumer application and configured to retrieve and propagate events from the storage partitions associated with each corresponding target consumer application;
   wherein the event streaming layer comprises a monitoring module configured to monitor the propagation and delivery of each event in the event source, by a respective event streaming cluster, based on event notifications received from the event producer module indicating the propagation of events to an event streaming module and event notifications received from each of the consumer modules indicating the delivery of corresponding propagated events, the monitoring module is configured, based on the information received from the event producer and each of the consumer modules, to update an event monitoring status table stored in a database associated with the monitoring module and at least indicating the delivery status of each propagated event,
   wherein in response to determining unsuccessful delivery of a given event, the monitoring module notifies the event producer module to re-propagate the given event to a different respective event streaming cluster than an initial event streaming cluster to which the given event was submitted, and
   wherein upon receiving a notification to re-propagate the propagated event from the monitoring model, the event producer module selects an available event streaming cluster to re-submit the event.

2. The distributed event platform of claim 1, wherein in response to receiving an event notification from the producer module and/or the consumer module indicating a successful propagation and/or delivery of an event, the monitoring module is configured to update the transaction status of the corresponding event in a transaction status table stored in the event source configured to track the status of each event stored in the event source.

3. The distributed event platform of claim 1, wherein the monitoring module is configured, upon receiving an event propagation notification from the producer module indicating the propagation of an event, to initiate a corresponding timer indicating a target time frame for the propagated event to be delivered to the target consumer application.

4. The distributed event platform of claim 3, wherein the monitoring module is configured to stop the timers upon delivery of the corresponding propagated events.

5. The distributed event platform of claim 4, wherein, upon expiry of the timer or in response to receiving an event notification from a consumer module indicating unsuccessful delivery of an event, the monitoring module is configured to notify the event producer module to re-propagate the affected events.

6. The distributed event platform of claim 1, wherein the monitoring module is configured to monitor a set of operational parameters associated with the streaming modules and the consumer modules and, based on the values of the parameters, determine an operating performance of each corresponding consumer and/or streaming module.

7. The distributed event platform of claim 6, wherein in response to an operational performance value of streaming and/or consumer module being within a threshold value range indicating an operational failure and/or unavailability of the corresponding streaming and/or consumer module, the monitoring module is configured to notify the event producer module to re-propagate the affected events.

8. The distributed event platform of claim 6, wherein the event producer is configured to select streaming modules for propagating an event based on the operation performance information forwarded by the monitoring module.

9. The distributed event platform of claim 2, wherein the event producer module is configured, upon propagation of an event to a streaming module, to update the corresponding transaction status of the event in the transaction status table.

10. The distributed event platform of claim 1, wherein the event source is in the form of a data store configured to store event transactions received from one or more source systems.

11. The distributed event platform of claim 1, each streaming module is independent of one another and hosted on a separate virtual machine server cluster.

12. The distributed event platform of claim 1, wherein each virtual machine server cluster is hosted in a different isolation zone.

13. The distributed event platform of claim 1, wherein the event source is in the form of a relational database management system, RDBMS, configured to store event transactions received from one or more source systems.

14. The distributed event platform of claim 1, wherein the distributed event platform is part of a travel reservation system.

15. A method for processing events in a distributed event platform, the method comprising:
  receiving, at an event producer module, an event from an event source configured to store and push events to be propagated to one or more target consumer applications;
  queueing, at the event producer module, the event to be propagated;
  propagating, by the event producer, each event in the queue to a streaming module of an event streaming layer of the distributed event platform, each streaming module is configured to index and store the events into one or more storage partitions associated with one or more corresponding target consumer applications;
  retrieving, by a consumer module associated with one or more target consumer applications, an event from a corresponding storage partition of a streaming module;
  propagating, by the consumer module, the retrieved event to the target consumer applications
  monitoring, at a monitoring module, the propagation and delivery of each event in the event source based on event notifications received from the event producer module indicating the propagation of events to an event streaming module and event notifications received from each of the consumer modules indicating the delivery of corresponding propagated events; and
  updating, by the monitoring module, an event monitoring status table stored in a database associated with the monitoring module and at least indicating the delivery status of each propagated event,
  wherein in response to determining unsuccessful delivery of a given event, the monitoring module notifies the event producer module to re-propagate the given event to a different respective event streaming cluster than an initial event streaming cluster to which the given event was submitted, and
  wherein upon receiving a notification to re-propagate the propagated event from the monitoring model, the event producer module selects an available event streaming cluster to re-submit the event.

* * * * *